United States Patent [19]

Nielsen

[11] Patent Number: 5,761,436
[45] Date of Patent: Jun. 2, 1998

[54] METHOD AND APPARATUS FOR COMBINING TRUNCATED HYPERLINKS TO FORM A HYPERLINK AGGREGATE

[75] Inventor: Jakob Nielsen, Atherton, Calif.

[73] Assignee: Sun Microsystems, Inc., Palo Alto, Calif.

[21] Appl. No.: 674,049

[22] Filed: Jul. 1, 1996

[51] Int. Cl.$^6$ .................................................. G06F 17/30
[52] U.S. Cl. .................... 395/200.75; 395/604; 395/605; 395/612
[58] Field of Search ........................ 395/604, 605, 395/612, 762, 200.66, 200.75, 200.3, 200.33, 200.97

[56] References Cited

U.S. PATENT DOCUMENTS

| | | | |
|---|---|---|---|
| 4,985,863 | 1/1991 | Fujisawa et al. | 395/605 |
| 5,598,535 | 1/1997 | Brech et al. | 395/200.6 |
| 5,608,870 | 3/1997 | Valiant | 395/427 |

OTHER PUBLICATIONS

Document entitled "Handbook: Mail, News, and Bookmarks", info@netscape.com, 1994–1996 Netscape Communications Corp., http://home.netscape.com/eng/mozilla/2.0/handbook/docs/mnb.html#C9 (10 pages).

Document entitled Uniform Resource Locators (URL):, Network Working Group, Request for Comments: 1738, Category: Standards Track. T. Berner–Lee, CERN, L. Masinter, Xerox Corporation M. McCahill, University of Minnesota, Editors, Dec. 1994, (pp. 1–25).

Document entitled "Instant HTML Web Pages", by Wayne Ause, Macmillan Computer Publishing, 1995, (17 pages).

*Primary Examiner*—Lance Leonard Barry
*Attorney, Agent, or Firm*—Erwin J. Basinski

[57] ABSTRACT

Apparatus, methods, systems and computer program products are disclosed to provide a hypertext user with a history facility for displaying accessed hypernodes. The invention displays the history list to the user based on when the hypernode was accessed and based on the placement of the hypernode in the hyperlink hierarchy.

20 Claims, 13 Drawing Sheets

```
     Baber's Global Directory of Computer...
     Yahoo! - Business and Economy:Compa...
     Yahoo! - Business and Economy:Compa...
317→ Yahoo! - Business and Economy:Compa...
     Yahoo! - Business and Economy:Busine...
     Yahoo!
     California Bar - Sections
315→ The State Bar of California
     calbar links - other bars
     The State Bar of California - cabar li...
315→ The State Bar of California
     KuesterLaw Technology Law Resource...
319→ KuesterLaw Technology Law Resource...
     Legislative Publications
     Official California Legislative Informa...
     Search California Statutes
     Find California Code
     Ultra Computing for Business Solutions
     Sun's Server Family
     Netra nfs Server
321→ Netra NFS Server
     Sun Microsystems             313
```

```
     Baber's Global Directory of Computer...
     Yahoo! - Business and Economy:Compa...
     Yahoo! - Business and Economy:Compa...
     Yahoo! - Business and Economy:Compa...
     Yahoo! - Business and Economy:Busine...
     Yahoo!
     The State Bar of California
325→ http://www.cabar.org/2lin/
     California Bar - Sections
     The State Bar of California
327→ http://www.kuesterlaw.com/
329→ http://www.leginfo.ca.gov/
     Ultra Computing for Business Solutions
     Sun's Server Family
331→ http://www.sun.com/netra-nfs/
     Sun Microsystems
```

Baber's Global Directory of Computer...
Yahoo! - Business and Economy:Compa...
Yahoo! - Business and Economy:Compa...
317 — Yahoo! - Business and Economy:Compa...
Yahoo! - Business and Economy:Busine...
Yahoo!
California Bar - Sections
315 — The State Bar of California
calbar links - other bars
The State Bar of California - cabar li...
315 — The State Bar of California
KuesterLaw Technology Law Resource...
319 — KuesterLaw Technology Law Resource...
Legislative Publications
Official California Legislative Informa...
Search California Statutes
Find California Code
Ultra Computing for Business Solutions
Sun's Server Family
Netra nfs Server
321 — Netra NFS Server
Sun Microsystems         313

FIG. 3b

Baber's Global Directory of Computer...
Yahoo! - Business and Economy:Compa...
Yahoo! - Business and Economy:Compa...
Yahoo! - Business and Economy:Compa...
Yahoo! - Business and Economy:Busine...
Yahoo!
The State Bar of California
325 — http://www.cabar.org/2lin/
California Bar - Sections
The State Bar of California
327 — http://www.kuesterlaw.com/
329 — http://www.leginfo.ca.gov/
Ultra Computing for Business Solutions
Sun's Server Family
331 — http://www.sun.com/netra-nfs/
Sun Microsystems

FIG. 3c

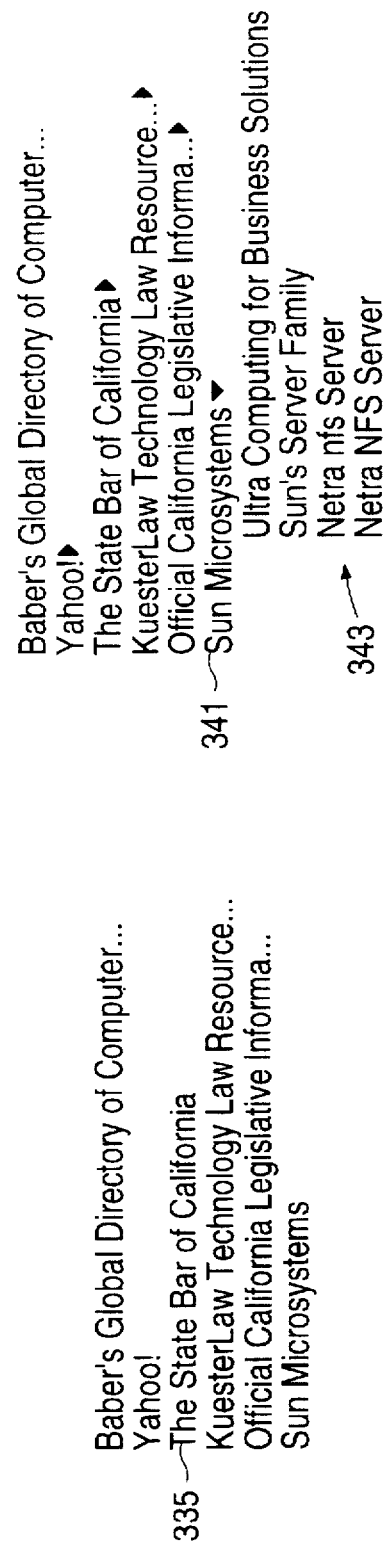

METHOD AND APPARATUS FOR COMBINING TRUNCATED HYPERLINKS TO FORM A HYPERLINK AGGREGATE

BACKGROUND OF THE INVENTION

1. Field of the Invention

This invention relates to the field of hypertext systems. Specifically, this invention is a new and useful method, apparatus, system and computer program product for maintaining a history of accessed hyperlinks used to access hypernodes.

2. Background

Although the invention applies to general hypertext apparatus, World Wide Web (WWW) Browser and WWW Server applications are representative of the technology. As such, much of this application describes the invention within the context of a preferred embodiment utilizing a WWW Browser application.

The WWW is a massive hypertext system that a computer user accesses using an information access apparatus such as a WWW Browser computer application. The WWW Browser application communicates with information provider apparatus such as WWW Server computer applications to obtain information and services in the form of Web Pages. These Web Pages (hypernodes) are identified by unique hyperlinks that in the WWW context are Universal Resource Locators (URL). Many WWW Browser applications provide a history capability for storing URLs of accessed Web Pages. This facility simplifies the user's access to previously visited Web Pages.

World Wide Web

The background of the WWW, WWW Browser applications, and Uniform Resource Locators (URL) is described by reference to the first chapter of *Instant HTML Web Pages*, by Wayne Ause, Ziff-Davis Press, ISBN 1-56276-363-6, copyright 1995, pages 1–15, hereby incorporated by reference as illustrative of the prior art. The URL specification, also incorporated by reference, is described in RFC1738 and can be found on the WWW at: "http://www.cis.ohio-state.edua/htbin/rfc/rfc1738.html". Briefly, the URL contains a protocol specification and a path specification. The protocol specification notifies the browser of what protocol to use when accessing the remote server. The path specification is generally a hierarchical path that specifies a data server followed by a hypernode (such as a Web Page) that actually provides the information for the browser.

As mentioned above, the WWW is a massive hypertext system. Thus the information provided to a user often includes references to related information in other hypernodes. These references are via hyperlinks. On the WWW activating these hyperlinks often results in accessing completely different Web Pages (supplied from completely different WWW Server applications on other computer systems) from the Web Page that contains the hyperlink. Thus, a user often follows many hyperlinks to reach a desired information or service. One difficulty when traversing these hyperlinks is that the user often loses track of the sequence of hyperlinks used to arrive at a particular hypernode. Thus, the user has difficulty returning to a hypernode of interest. A history facility addresses this problem by providing a mechanism to store and recall the specific hypernodes that have been previously accessed by the user. This facility is similar to the "GO" command of the Netscape® browser application. It is different from the bookmark facility because the bookmark facility requires the user to cause the computer to remember (that is, bookmark) the hypernode. The history mechanism automatically maintains a list of what hypernodes the user has accessed and makes this list available to the user.

WWW browser applications implement the history in different ways. The Netscape Navigator maintains a history limited to a single session. Thus the history list is initialized on every invocation of the application. The Microsoft Internet Explorer, on the other hand, maintains a persistent history list that extends across invocations. Often the Netscape Navigator application is invoked on a Monday morning, and terminated on a Friday afternoon. Thus for both applications (and others like them) the history list can become quite long.

A long history list that accumulates over an extended period of time becomes difficult for a user to access because of the shear amount of material provided to the user. Further, the history list is preferably used to refer to recently accessed hypernodes (otherwise the user would utilize the book mark facility) thus, the user has difficulty when scanning a long intermixed list of recently accessed and aged hypernodes to determine which hypernode is the one of interest.

The invention addresses these problems and simplifies a hypertext user's interaction with a history mechanism.

SUMMARY OF THE INVENTION

The present invention provides an economical, apparatus, method, system and computer program product for providing enhanced facilities to computer users. The invention provides a user of a hypertext system with an enhanced history presentation that allows the user to more quickly find and reference previously viewed hypernodes.

One aspect of the invention is a computer controlled method for presenting to a user information relating to a plurality of hyperlinks. The method first creates a plurality of truncated hyperlink references by determining a truncated hyperlink for each of the plurality of hyperlinks. Next, the method matches a first truncated hyperlink reference to a second truncated hyperlink. The first and second truncated hyperlinks respectively reference a first and second information. Next, the method combines the first and second truncated hyperlink reference to form a hyperlink aggregate. This hyperlink aggregate also having aggregate information. Finally, the method presents the aggregate information in place of presenting the first and second information.

In another aspect of the invention, an apparatus is disclosed having a central processing unit, a memory and a display device and configured to present information relating to each of a plurality of hyperlinks. The apparatus includes a creation mechanism the creates a plurality of truncated hyperlink references by determining a truncated hyperlink for each of the plurality of hyperlinks. A matching mechanism is also included that matches a first truncated hyperlink reference with a second truncated hyperlink reference. Both truncated hyperlink references created by the creation mechanism. The first and second truncated hyperlink references respectively have a fist and second information. A combination mechanism combines the first and second truncated hyperlink references to form a hyperlink aggregate. This hyperlink aggregate having an aggregate information. Finally, the apparatus includes a presentation mechanism to present the aggregate information instead of the first and second information.

Another aspect of the invention is a system to present information relating to each of a plurality of hyperlinks. This system includes a creation mechanism the creates a plurality of truncated hyperlink references by determining a truncated hyperlink for each of the plurality of hyperlinks. A matching mechanism is also included that matches a first truncated hyperlink reference with a second truncated hyperlink reference. Both truncated hyperlink references created by the creation mechanism. The first and second truncated hyperlink references respectively have a fist and second information. A combination mechanism combines the first and second truncated hyperlink references to form a hyperlink aggregate. This hyperlink aggregate having an aggregate information. Finally, the apparatus includes a presentation mechanism to present the aggregate information on a display device instead of presenting the first and second information.

Yet a final aspect of the invention is a computer program product on a computer usable medium for causing a computer to present information relating to each of a plurality of hyperlinks on a display device. When executed on a computer, the computer readable code causes a computer to effect a creation mechanism, a matching mechanism, a combination mechanism and a presentation mechanism having the same functions as the system described above.

The foregoing and many other objects and advantages of the present invention will no doubt become obvious to those of ordinary skill in the art after having read the following detailed description of the preferred embodiments that are illustrated in the various drawing figures.

DESCRIPTION OF THE DRAWINGS

FIGS. 3a–e illustrate a selection of different methods that can be used to present a hypernode history list in accordance with a preferred embodiment;

DESCRIPTION OF THE PREFERRED EMBODIMENTS

Notations and Nomenclature

Figure 1:
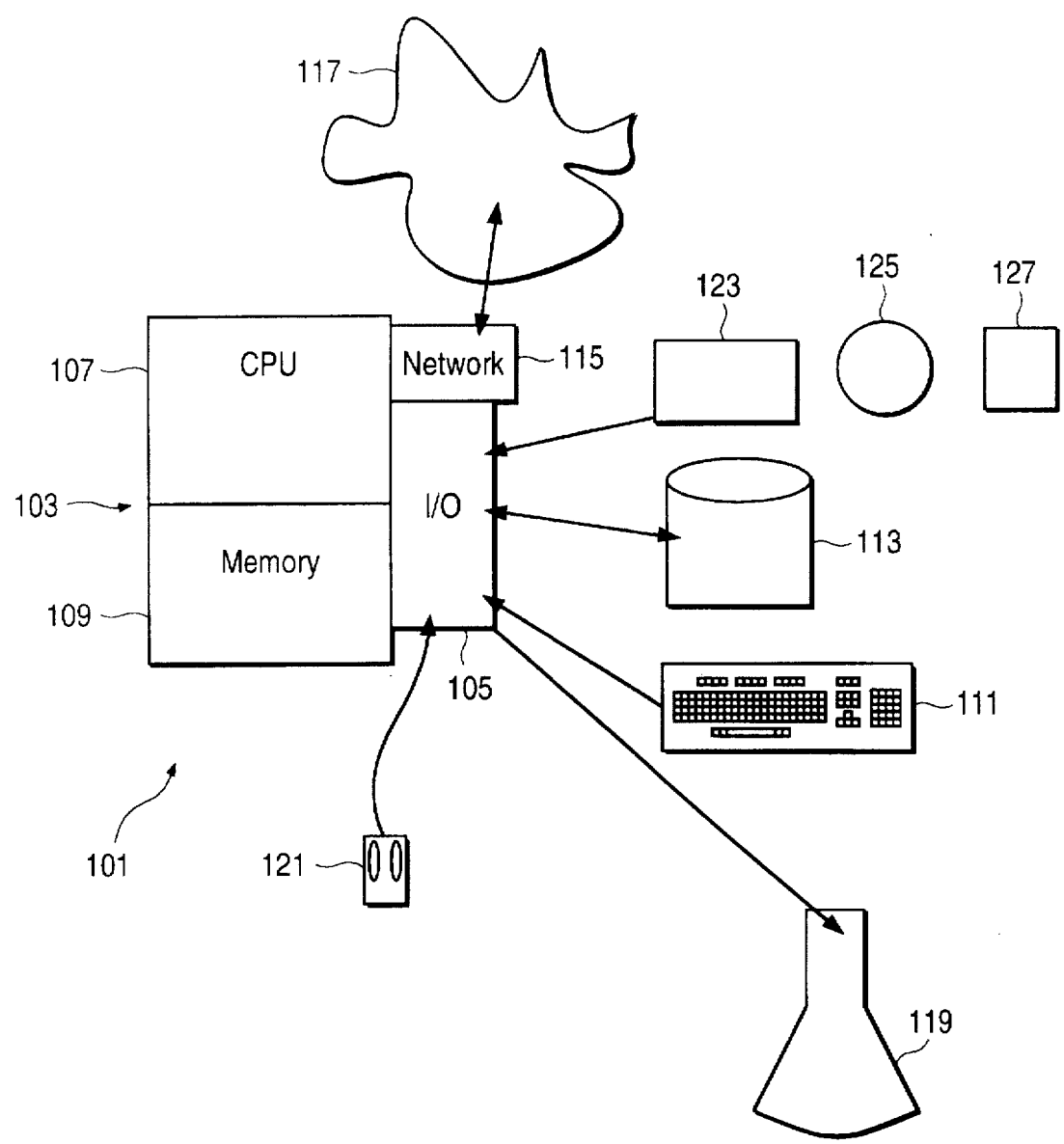
FIG. 1 illustrates a portion of a computer system, including a CPU and a conventional memory in which the present invention may be embodied.

The following "notations and nomenclature" are provided to assist in the understanding of the present invention and the preferred embodiments thereof.

Data Record—An embodiment of a data structure in a computer memory or storage where the storage is organized according to the data structure. This application uses reference numerals in the specification to refer to specific data records or to data organized according to a particular data structure as indicated by the context of the discussion.

Data Structure—A specification of the organization and use of data in a data record. A data structure embodied in memory is a data record. A data structure shows the interrelationships of a collection of data.

Graphical User Interface (GUI)—A user interface that allows a user to interact with a computer display by pointing at selectable control areas on the display and activating a command or computer operation associated with the selectable control area. GUIs are well known in the art.

Pointing device—A device that is responsive to a computer user's input that moves an indicator on a computer display screen. Such an indicator has an active point such that if the pointing device is activated (for example, by a button push for a mouse device) a command associated with the selectable control area covered by the active point is invoked. Pointing devices are generally used with graphical user interfaces.

Selectable control area—An area on a computer display that is sensitive to activation of a pointing device. On activation of the pointing device over the selectable control area, a command or computer operation associated with the selectable control area is invoked. Most computer systems that provide a Graphical User Interface (GUI) also provide other methods for invoking these commands or computer operations such as keyboard function keys or command lines.

Text String—Ordered computer data in a computer that represents text. One common representation of a text string is a sequence of eight bit bytes each containing an ASCII representation of a character. Such a sequence is often terminated by a byte whose value is zero or by having a leading value indicate the length of the string. One skilled in the art will understand that there exist many methods for storing text strings beyond the ones mentioned here.

Web Page—A subset of Internet resources. As used in this application, a Web Page is identical to the resource described in the HTTP protocol. That is: A network data object or service that can be identified by a Universal Resource Locator (URL). A web page is a specific instance of a hypernode.

URL—See Web Page. Also see RFC1738.

Window—An area, usually rectangular, on a computer display screen controlled by an application.

Procedure—A self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Overview

The manipulations performed by a computer in executing opcodes are often referred to in terms, such as adding or comparing, that are commonly associated with mental operations performed by a human operator. In the present invention no such capability of a human operator is necessary in any of the operations described herein. The operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (for example, mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the following description. Also, the invention may be embodied in a computer readable storage medium encoded with a program that causes a computer to perform the programmed logic.

A preferred embodiment of the invention provides a hypertext user with a reduced history list that maintains the detail references to hypernodes accessed within a preference interval, but also aggregates older hypernodes to reduce the amount of information immediately displayed to the user.

Operating Environment

FIG. 1 illustrates a computer system referenced by a general reference character 101, configured to support the invention. The system 101 includes a processor 103 having an InputlOutput ("I/O") section 105, a central processing unit ("CPU") 107 and a memory section 109. The I/O section 105 is connected to a keyboard 111, a disk storage unit 113, a network interface 115 to provide access to a network 117, a display unit 119, a pointing device 121, and a CD-ROM drive unit 123. The CD-ROM unit 123 can read a CD-ROM medium 125 that typically contains a plurality of programs and data 127. The CD-ROM 123 drive unit, using the CD-ROM medium 125, and the disk storage unit 113 comprising a filestorage mechanism. One skilled in the art will understand that the filestorage mechanism may comprise read only memory, RAM or other storage technology that allows a computer to access data. Such a computer system is capable of executing programmed logic that embodies the invention.

Figure 2:
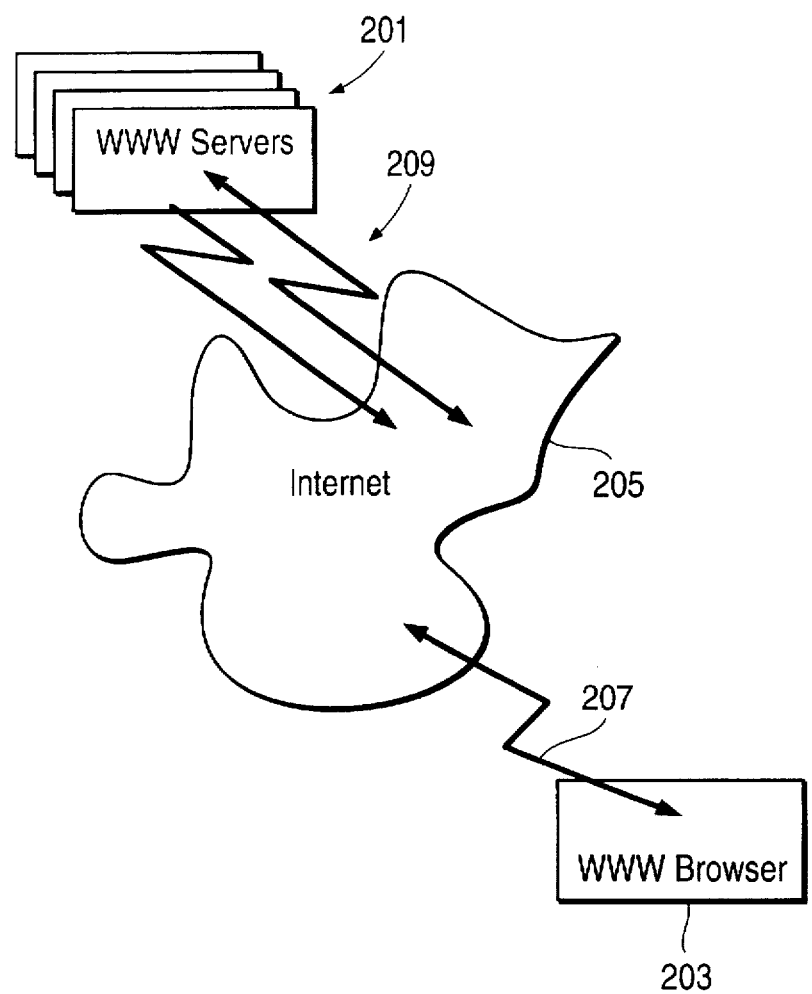
FIG. 2 illustrates concepts of the World Wide Web hypertext system.

FIG. 2 illustrates how a WWW based hypertext system operates. A plurality of WWW servers 201 are accessed by a WWW browser 203. Both the WWW servers 201 and the WWW browser 203 are connected to a network of networks 205 commonly called the Internet 205. The WWW browser 203 is connected to the Internet 205 as indicated by an arrow 207. Similarly the WWW servers 201 are connected to the Internet 205 as indicated by a plurality of arrows 209. In operation, a user of the WWW browser receives hypernode information from a WWW server. This information generally includes hyperlinks. Hyperlinks are user selectable objects that invoke the presentation of information from a different hypernode than the current hypernode. Most browser applications maintain a history of the hypernodes accessed by the user.

Figure 3A:
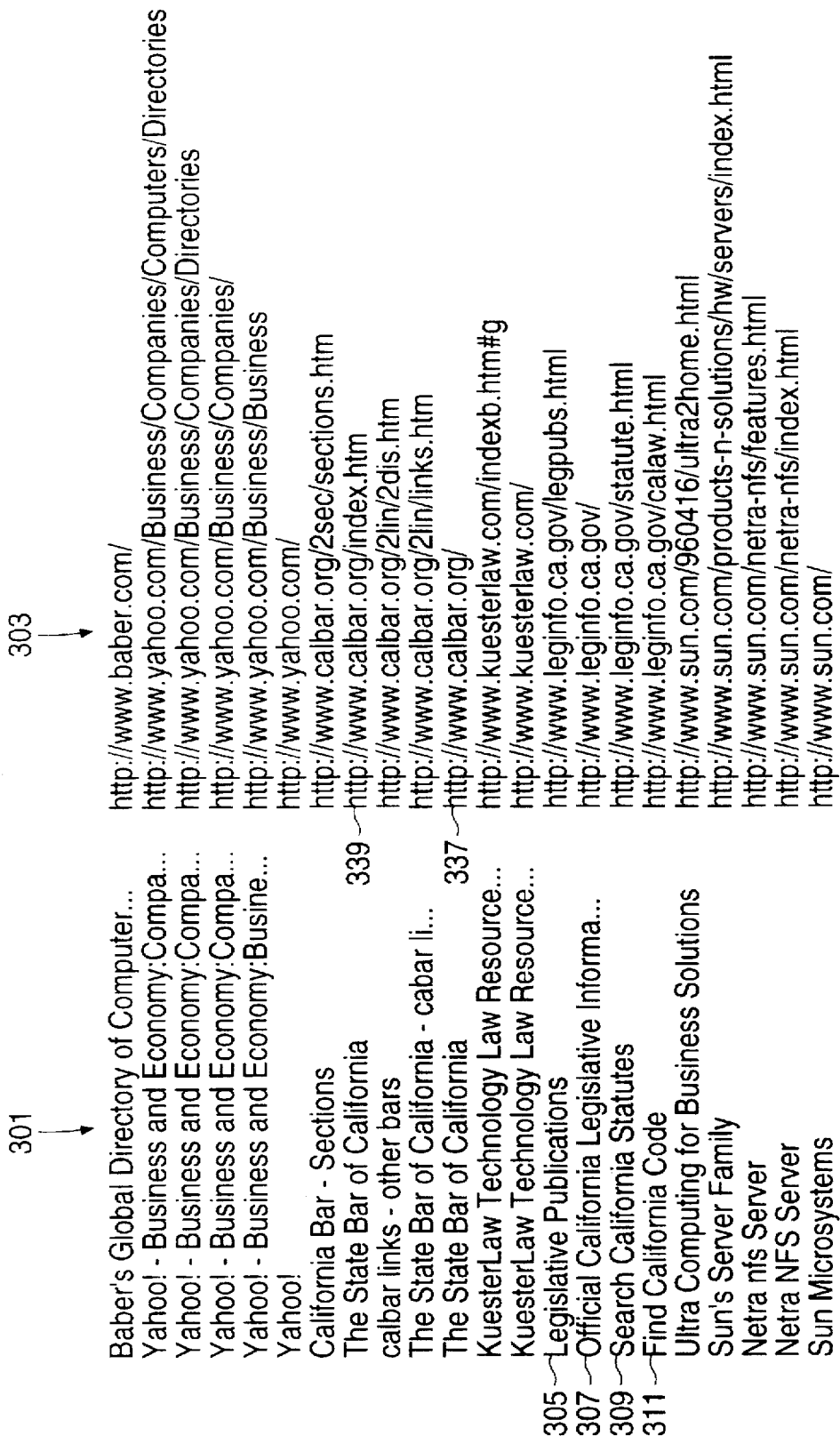

FIG. 3a illustrates the relationship of hypernode titles and hyperlinks as shown by a prior art history display. A listing 300 of the history information includes a plurality of Web Page titles 301 along with a plurality of matching URLs 303. A plurality of Web Page titles 305, 307, 309 and 311 are used to illustrate a number of characteristics of the Web Page titles 301 and the URLs 303. The Web Pages indicated by 305, 309 and 311 are all specified using URLs fully specifying the hypernode as indicated (for 311) by the "calaw . html" text at the end of the URL. This text specifies a unique Web Page file that is accessed by the URL. Now compare the URL associated with the Web Page title indicated by 307. This URL terminates in a "/" character. Thus, the WWW server application on receipt of this URL provides a default Web Page.

FIG. 3b illustrates how the history data of FIG. 3a would be presented to a user of a prior art WWW browser application. A display 313 of the historical data consists of the Web Page titles of the accessed URLs. Some of the impediments to the user in understanding this display 313 are illustrated by examining a plurality of entries labeled as 315. These titles both indicate that they are the Web Pages for the State Bar of California. However, these titles reference different URLs (www. cabar. org/index. htm vs. www. calbar. org). However the same file may be accessed by both these URLs even though the URL's are different, depending on the defaults and aliases used by the WWW server.

Additionally, a plurality of Yahoo page titles 317 are indicated that look the same from the titles presented. Referring back to FIG. 3a, these Web Pages have different URLs. Also a plurality of KuesterLaw references 319 do not differentiate between the references.

FIG. 3c illustrates the reduction in size of the history display by using the invention. Here the URL's having the same parent directory are collapsed into a plurality of aggregates labeled as 325, 327, 329, and 331. The title of these aggregates is simply the common URL between the aggregated URLs.

FIG. 3d illustrates a further reduction of the size of the history display if each Web Page contained a META parent specification addressing the top level Web Page. A displayed Parent Web Page title for the "State Bar of California" 335 is presented. This title 335 is extracted from a parent Web Page. Both the Web Page addressed by a URL 337 and the Web Page addressed by a URL 339 contain META parent specifications addressing the same parent Web Page. Thus, only the one California Bar title 335 is presented. This same approach is used with the other Web Page hierarchies.

FIG. 3e illustrates another reduction of the size of the history display that continues to provide the user with access to the underlying Web Pages. In this illustration, the displayed Web Page titles associated with aggregates have indicators (the triangles) that inform the user that the history reference is an aggregate. By selecting the indicator, the user can expose the underlying structure of the aggregate. Thus, a title of an aggregate 341 can expose a plurality of other Web Pages 343 that make up the aggregate 341.

Figure 4:
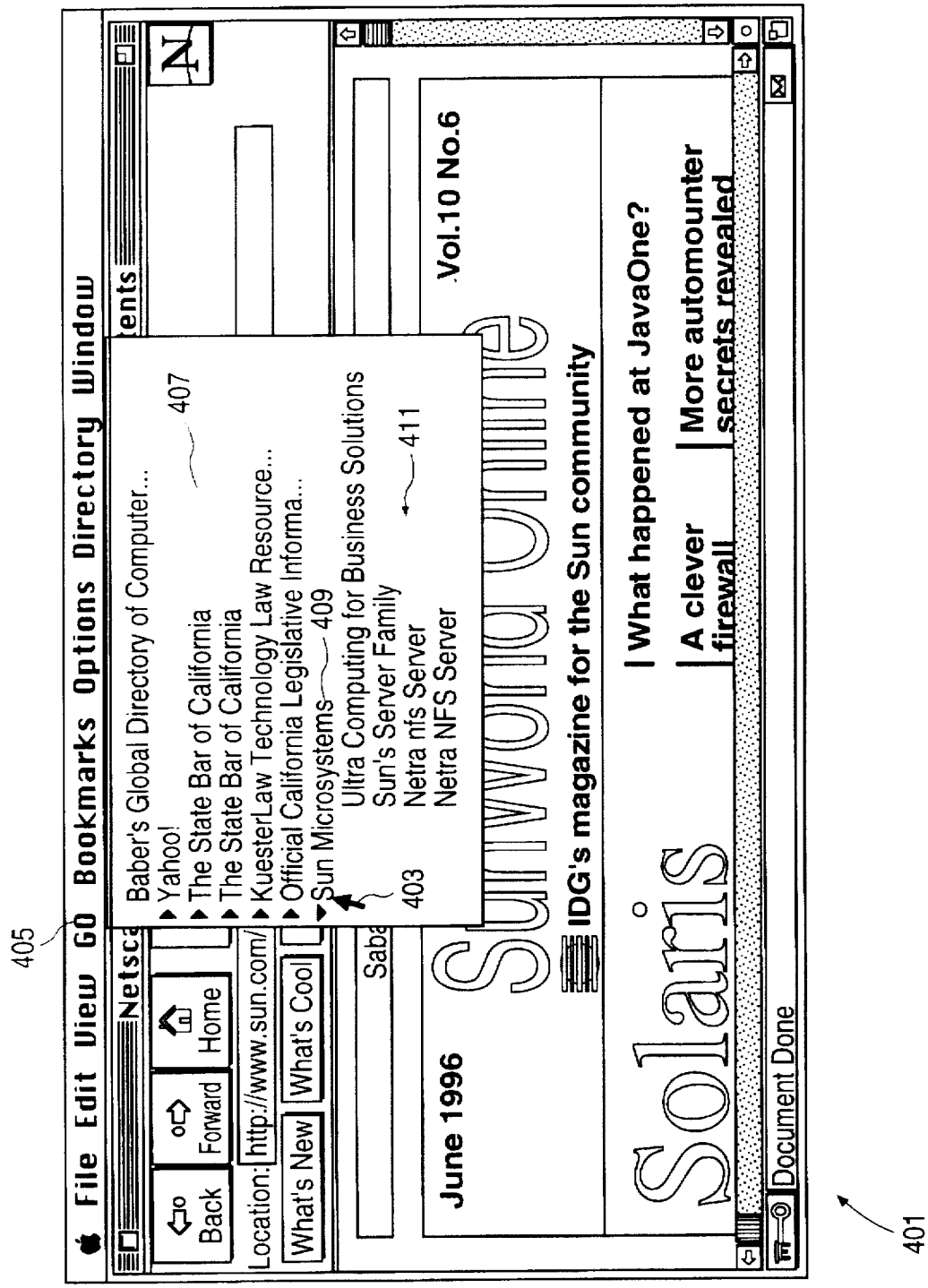
FIG. 4 illustrates use of the invention in accordance with a preferred embodiment.

FIG. 4 illustrates a display from an example WWW browser 401 using the invention. Here the user has moved a cursor 403 over a "GO" menu item 405 and has dragged the cursor 403 down a resulting menu display 407 stopping at an aggregate title 409. After a short pause, the aggregate title 409 expands into a plurality of component Web Pages 411 that make up the aggregate, thus allowing the user to select an aged Web Page.

History Data Structure

Figure 5:
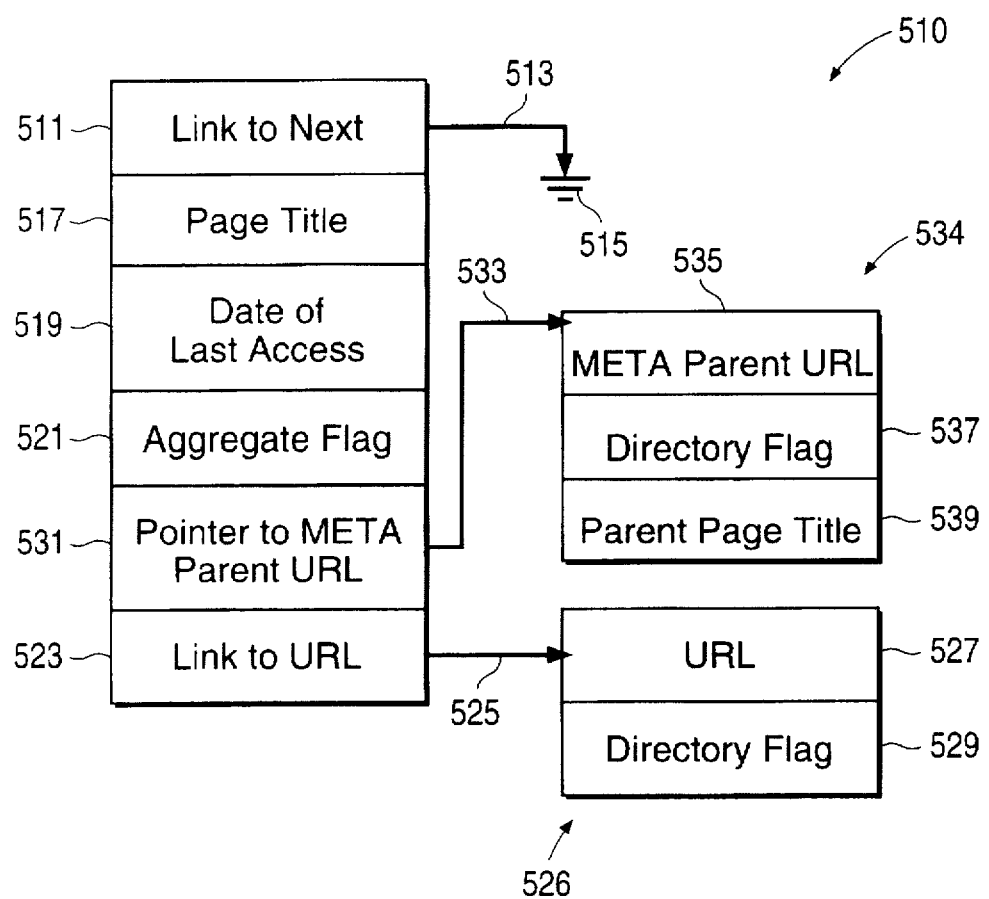
FIG. 5 illustrates the history data structure used in accordance with a preferred embodiment.
Figure 5:
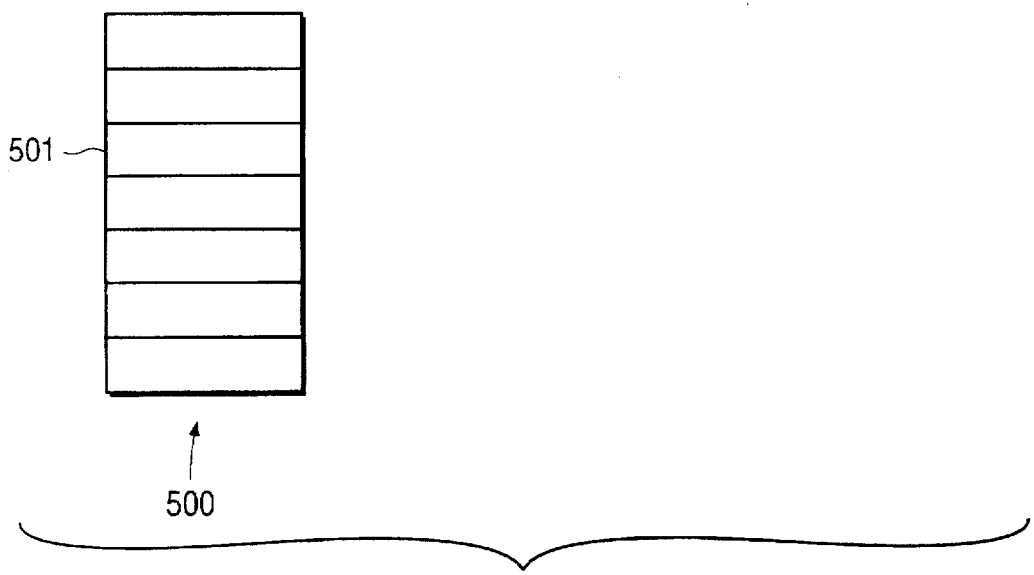

FIG. 5 illustrates two of the data structures used in a preferred embodiment of the invention. A history list array 500 stores information in a plurality of elements 501. The information stored in each of the elements 501 is illustrated by a plurality of history data structures 510. The purpose of the history list array 500 is to remember which hyperlinks a user has accessed while browsing. This allows the user to backtrack to a previously visited page accessed through the hyperlink. In the context of the WWW, hyperlinks are URLs and hypernodes are Web Pages. One skilled in the art will understand that the history list array 500 could be implemented as a list or a stack or in any number of ways well known in the art.

Looking now at the fields in the history data structure 510. The data structure 510 is used to store information relating to accessed hyperlinks. A "Link to Next" field 511 contains a pointer to a history data record as indicated by an arrow 513. The circumstance when the field 511 contains a NIL is indicated on the diagram when the arrow 513 points to a termination symbol 515. A program accessing the history data record follows the pointers contained in the "Link to Next" field 511 until the field 511 contains a NIL. The "Link to Next" field 511 is used to link to other history data structures containing hyperlink information belonging to the aggregate.

In one preferred embodiment, a "Page Title" field 517 contains the textual data, or data that directly or indirectly references the textual data comprising the title of the hypernode. For a Web Page, this field 517 contains the information in the "Title" element in the head section of the Web Page HTML data accessed through a URL. This information is retrieved as described below. In another preferred embodiment the "Page Title" field 517 refers to non-textual data used to identify the hypernode. This non-textual data includes, without limitation, audio, video, and image data. Regardless of the type of data, this data comprises some of the information that is provided to the user by the invention.

A "Date of Last Access" field 519 contains a representation of the date when the hyperlink, associated with the history data structure, was last accessed by the user. In the case of an aggregate history data structure, this field 519 contains the date of the most recent access of all of the hyperlinks comprising the aggregate.

An "Aggregate Flag" field 521 contains a boolean flag that if TRUE identifies the history data record 510 as an aggregate record. An aggregate record links to history data structures containing similar hyperlinks. Thus, when displaying the history list array 500 the information from the aggregate history data record is presented to the user instead of the information from the other history data records linked to the aggregate through the "Link to Next" field 511.

A "Link to URL" field 523 contains a reference to the hyperlink that provides access to the hypernode. Here an arrow 525 indicates that the "Link to URL" field 523 points to a URL record 526. The URL record 526 contains a "URL" field 527. The "URL" field 527 contains the textual data, or data that directly or indirectly references the textual data comprising the hyperlink specification of a hypernode. Again in the WWW context, the "URL" field 527 contains a URL having the characteristics described RFC1738. If the hyperlink specified in the "URL" field 527 does not specify a hypernode, a "Directory Flag" field 529 contains the boolean value of TRUE. Conversely, if the "URL" field 527 references a hypernode the "Directory Flag" field 529 contains the boolean value of FALSE. In the case of the WWW if the "Directory Flag" field 529 is TRUE, the last character of the hyperlink text associate with the "URL" field 527 will be the "/" character. As mentioned above, a URL that specifies a directory will retrieve the default Web Page for that directory.

If a "Link to META Parent URL" field 531 contains a NIL, the textual data contained in or referenced by the "Page Title" field 517 will be the title of the hypernode accessed by the URL associated with the "URL" field 527. However, if the "Link to META parent URL" field 531 is not NIL, it 531 points, as indicated by an arrow 533, to a META URL record 534. The META URL record 534 contains a "META Parent URL" field 535, a "Directory Flag/" field 537, and a "Parent Page Title" field 539. The "Directory Flag" field 537 serves a similar purpose as the "Directory Flag" field 529 discussed above but as applied to the "META Parent URL" 535 instead of the "URL" field 527. The "META Parent URL" field 535 contains, or references directly or indirectly, the hyperlink text that references the parent hypernode. The parent hypernode is specified by a HTML META-markup contained within the hypernode data accessed by the hyperlink associated with the "URL" field 527 and is formatted as described below.

If the "META Parent URL" field 537 is not NIL, the "Parent Page Title" field 539 contains the textual data, or data that directly or indirectly references the textual data comprising the parent hypernode' title text. When the child hypernode is accessed by an application, the application also attempts to access the parent hypernode. If successful, the application extracts the parent page title and stores it using the "Parent Page Title" field 539. If the application cannot access the parent hypernode, any existing title associated with the "Parent Page Title" field 539 is left unchanged.

The HTML META markup within a child hypernode that specifies a parent hypernode consists of the following text embedded in the header portion of HTML data:

<!-- META NAME="parent" VALUE="url" -->

Every time a hyperlink accesses a page, this parent URL, if it exists, is stored in the "META Parent URL" field 535 of the URL record 534. Further, the parent hypernode is accessed to extract the title of the parent hypernode. This extracted parent page title is stored using the "Parent Page Title" field 539. One skilled in the art will understand that there are many ways of extracting the title of the parent hypernode. These extend from transferring the parent hypernode to the browser to using the HTTP "Head" method to return the header portion of the hypernode.

Example Aggregate using the History Data Structure

Figure 6A:
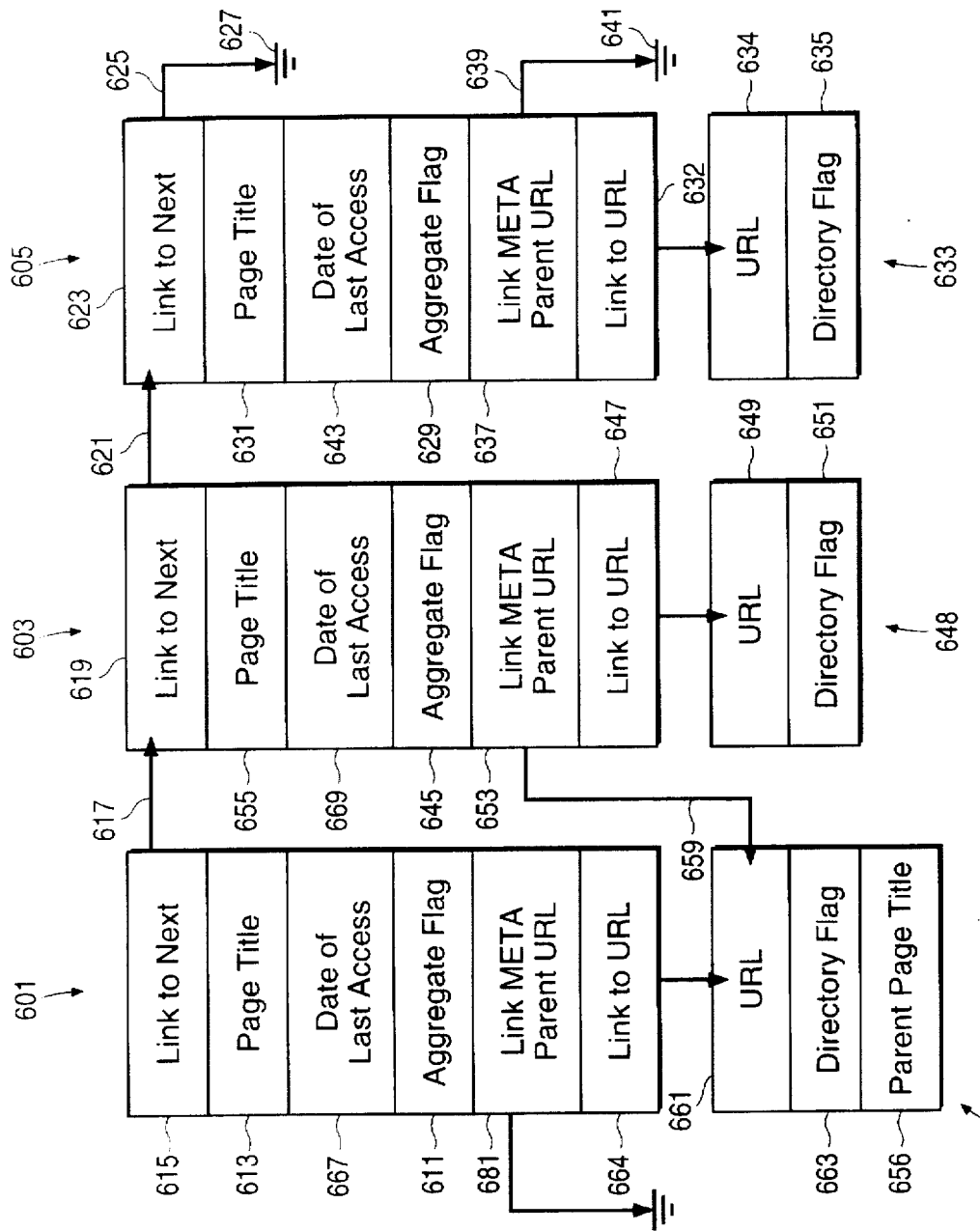
FIG. 6a illustrates the organization history data records that comprise an aggregate data structure in accordance with a preferred embodiment.

FIG. 6a illustrates how history data records using the history data structures 510 are used to represent an aggregate. Here, a history data record represents an aggregate 601 containing a plurality of two non-aggregated records 603 and 605. The aggregate's 601 "Aggregate Flag" field 611, is TRUE defining the history data record to be an aggregate. A "Page Title" field 613 contains or references directly or indirectly a text string that will be presented to the user as the aggregate title when the user invokes display of the history list. The "Link to Next" field 615 contains a pointer to the history data record that contains information about one of the hyperlinks that make up the aggregate. In this example, an arrow 617 represents the pointer contained in the "Link to Next" field 615 linking the aggregate 601 to the non-aggregate record 603. A "Link to Next" field 619 in the nonaggregate record 603 contains a pointer to the next history data record 605 making up the aggregate. This pointer is represented by an arrow 621. Finally, a "Link to Next" field 623 of the history data record 605 contains NIL terminating the aggregate list. This NIL value in the "Link to Next" field 623 is represented in the figure by an arrow 625 pointing to a termination symbol 627.

Because the "Aggregate Flag" field 629 of the record 605 is FALSE the record 605 is not an aggregate. A "Page Title" field 631 contains the title of the hypernode specified by a URL record 633 (pointed to by a "Link to URL" field 632) containing a "URL" field 634. If a "Directory Flag" field 635 in the URL record 633 is FALSE, the "Page Title" field 631 contains the title of the hypernode specified by the hyperlink in the "URL" field 634. If the "Directory Flag" field 635 is TRUE, the "Page Title" field 631 contains the title of the default hypernode for the directory specified by the hyperlink in the "URL" field 634. The "Pointer to META Parent URL" field 637 contains a NIL as indicated by an arrow 639 pointing to a termination symbol 641. The "Date of Last Access" field 643 contains the date when the hypernode specified by the "URL" field 634 was last accessed.

The record 603 is also a non-aggregate record as indicated by the "Aggregate Flag" 645 field being FALSE. Similar to the record labeled as 605, the "Link to URL" field 647 points to a "URL" record 648 having a "URL" field 649 and a "Directory Flag" field 651. However, this record 603 differs from the record labeled as 605 because the hypernode pointed to by the hyperlink in the "URL" field 649 contains a META NAME parent markup. This explicit specification, contained within the target hypernode, of the parent hypernode takes priority over other methods (described below) for determining the parent hypernode and results in a non-NIL "Pointer to META Parent URL" field 653. Thus, no aggregate can contain multiple history data records whose respective "Link to META Parent URL" fields are not NIL and access different hypernodes. Thus, although a "Page Title" field 655 is associated with the title of the child hypernode, a "Parent Page Title" field 656 is associated with the title of the parent hypernode.

Because a parent hypernode has priority over other methods of indicating aggregates, the aggregate record 601 itself must adopt the parent hypernode specified in the record 603. Thus, the "Link to META Parent URL" field 653 of record 603 points, as shown by an arrow 659, to a META URL record 660 containing a "URL" field 661, a "Directory Flag" field 663, and the "Parent Page Title" field 655 as does a "Link to URL" field 664 of the aggregate record 601. The "Page Title field" 613 contains the same page title as that in the "Parent Page Title" field 656.

Finally, a "Date of Last Access" field 667 in the record 601 contains the date of most recent access of any of the hyperlinks in the records 603 and 605 as determined from the dates contained in a "Date of Last Access" field 669 and the "Date of Last Access" field 643. The "Link to META Parent URL" field 681 is NIL as there is no parent URL for this aggregate.

The above discussion illustrates how the history data records interrelate to represent an aggregate. One skilled in the art will understand that this specific data structure is not required to practice the invention, but instead represent a preferred embodiment of the invention. One skilled in the art will understand that other data structures and organizations are contemplated by the invention.

Figure 6B:
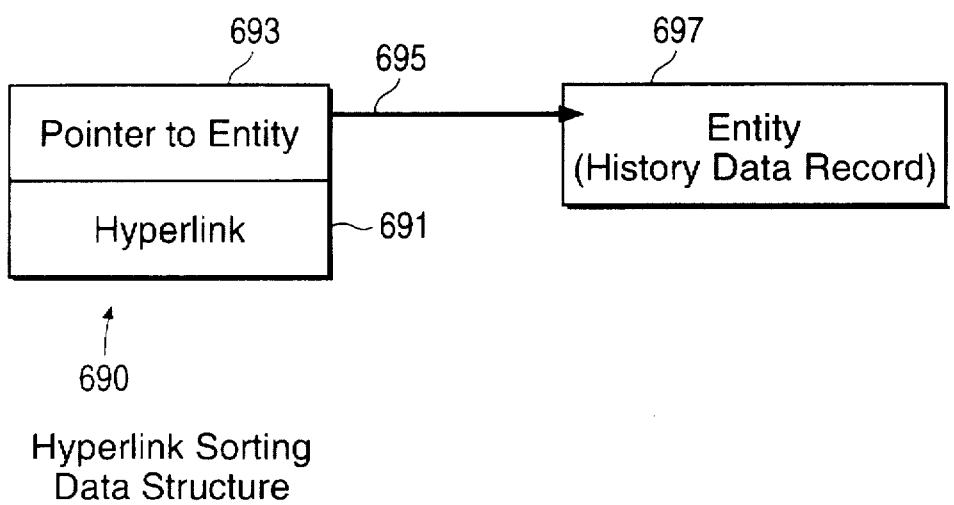
FIG. 6b illustrates a data structure used to create aggregate history data records in accordance with a preferred embodiment.

FIG. 6b illustrates a hyperlink sorting data structure 690 used for storing temporary hyperlink information. The data structure 690 receives hyperlink from a history data record 691 such as is described for FIG. 5. The "Pointer to Entity" field 693 contains a pointer to the history data record 691 from which the hyperlink data is extracted. The "Hyperlink Text"field 691 contains, or contains a printer that directly or indirectly references, a copy of the hyperlink text. The use of the hyperlink sorting data structure 690 is described below.

The Aggregation process

Figure 7:
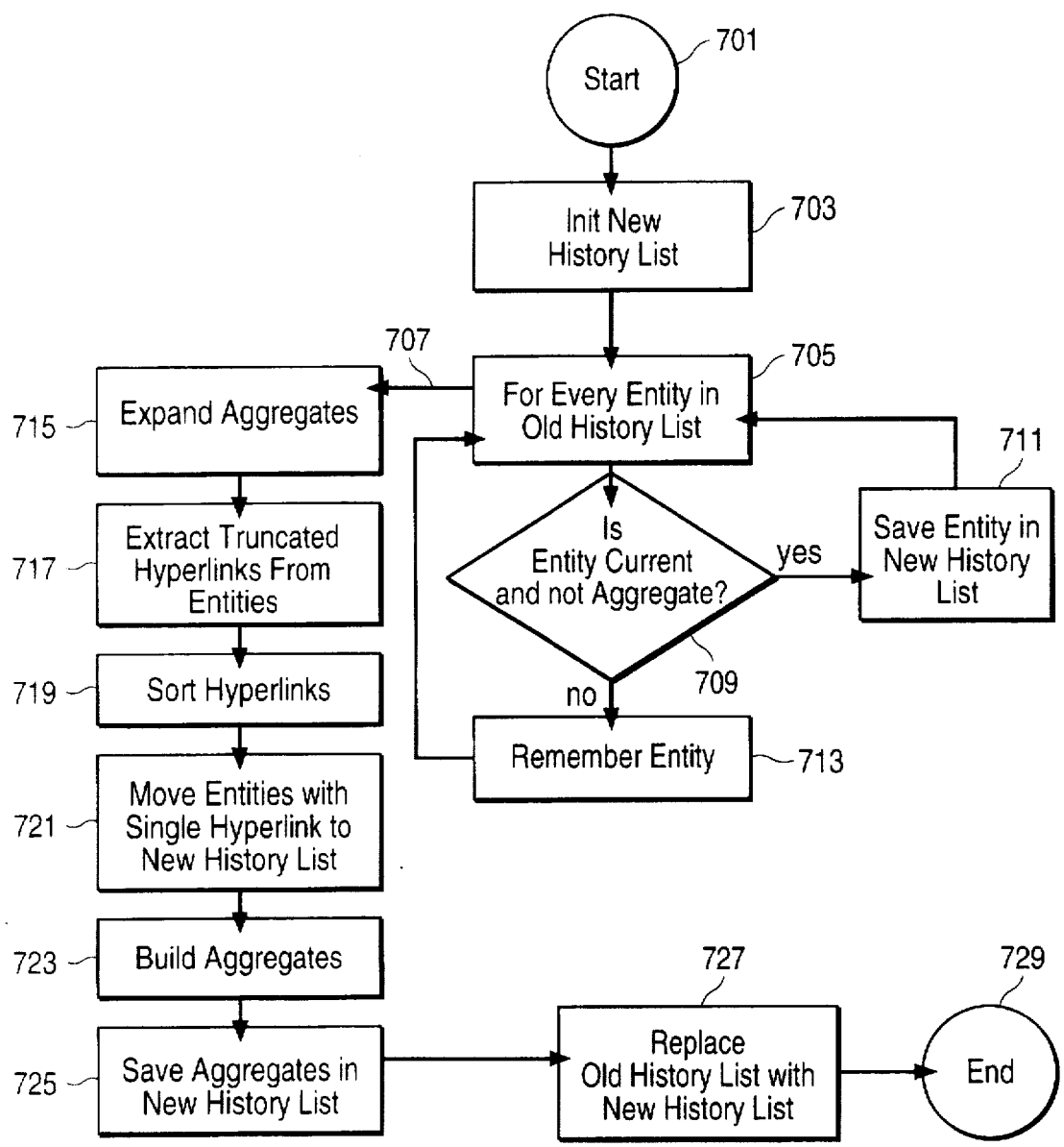
FIG. 7 illustrates the overall process for aggregating entries in a hyperlink history list in accordance with a preferred embodiment.

FIG. 7 illustrates the process used to aggregate a hyperlink history list. This process is performed once a day when the user's computer is in a low load condition. The process starts at a terminal 701 and at a step 703 initializes a new history list that will contain data history records 510. This new history list will be used to replace the existing old history list (also comprised of history data records 510) after aggregation is performed. The old history list contains the hyperlinks that are displayed to the user to present the user with the history information. At the end of the process, the new history list replaces the old history list and the information contained in the new history list is now the history information presented to the user. At an iteration step 705, the process examines every history data record 510 in the old history list. The following refers each history data record 510 as an entity. When all entities in the old history list have been examined, the process continues as indicated by an arrow 707. At a decision block 709 each entity in the old history list is examined to determine whether the entity is current and not an aggregate. If the "Date of Last Access" field 519 of the entity indicates that the underlying hypernode has been accessed within some user preference period and that the "Aggregate Flag" field 521 is FALSE the entity record is moved to the new history list at a step 711. Placing the entity record in the new history list removes the possibility of the entity record being aggregated. Then the iteration step 705 continues. The reason that recently accessed entities and aggregate entities are not transferred to the new history list in this preferred embodiment is that aggregate entities need to be separated into their composite history data records 510 so that additional history data records 510 can be added to a new aggregate. One skilled in the art will understand that another embodiment of the invention first inserts aged entities into the existing aggregates and then aggregates the remaining entities as described below.

If at the decision block 709, the entity is an aggregate or if the entity has not been accessed for a sufficiently long period, the process continues to a step 713 where the entity is remembered and the iteration step 705 continues.

Once all the entities from the old history list have been moved to the new history list or remembered, the process continues as indicated by the arrow 707 to a step 715 where each aggregate is disassembled and entities corresponding to the history data records 510 linked to the aggregate are remembered. This process is further illustrated in FIG. 8. The aggregate data record 510 itself is discarded after disassembly. The process then moves to a step 717.

The step 717 creates a hyperlink sorting data record 690 and extracts a copy of the hyperlink specification from each entity. The step 717 also links the hyperlink sorting data record 690 back to its source entity by storing a pointer to the entity in the "Pointer to Entity" field 693 of the record. If the lowest level of the hierarchy of the hyperlink explicitly specifies a hypernode, the step 717 also removes the hypernode from the hyperlink pecification. This process is described in FIG. 9 and results in a truncated hyperlink pecifying a hierarchical reference that is one step removed from a specific hypernode. (That is, in the WWW instance, "http://www.sun.com/netra-nfs/features.html" is truncated to "http://www.sun.com/netra-nfs/").

In another preferred embodiment, this step 717 first locates all the entities having a common META parent URL and aggregates these entities and saves the aggregate in the new history list. This allows a parent aggregation that includes component hypernodes having completely different hyperlinks. In both of these preferred embodiments, the process continues to a sort hyperlink step 719.

At the sort hyperlink step 719, the truncated hyperlinks are sorted according to their hierarchical structure. This sorting step results in identical matching truncated hyperlinks being grouped together. Next at a step 721 the sorted truncated hyperlinks are examined to locate singleton truncated hyperlinks. The entity pointed to by the "Pointer to Entity" field 693 of each of the singleton truncated hyperlinks is moved to the new history list and the corresponding sorting data record 690 is deleted.

At this point the truncated hyperlinks consist of multiple occurrences of matching truncated hyperlinks grouped together. These grouped truncated hyperlinks have common hyperlink hierarchy. These groups of truncated hyperlinks define which entities are aggregated. At a step 723 the process builds aggregates by combining the truncated hyperlinks from these groups. This process is further described below for FIG. 10. At this point, the current entities have been saved in the new history list, the entities that can not be aggregated have been saved in the new history list, and now at a step 725 the newly created aggregates are saved in the new history list. At a step 727, the old history list is replaced by the new history list and the process completes through a terminal 729.

Figure 8:
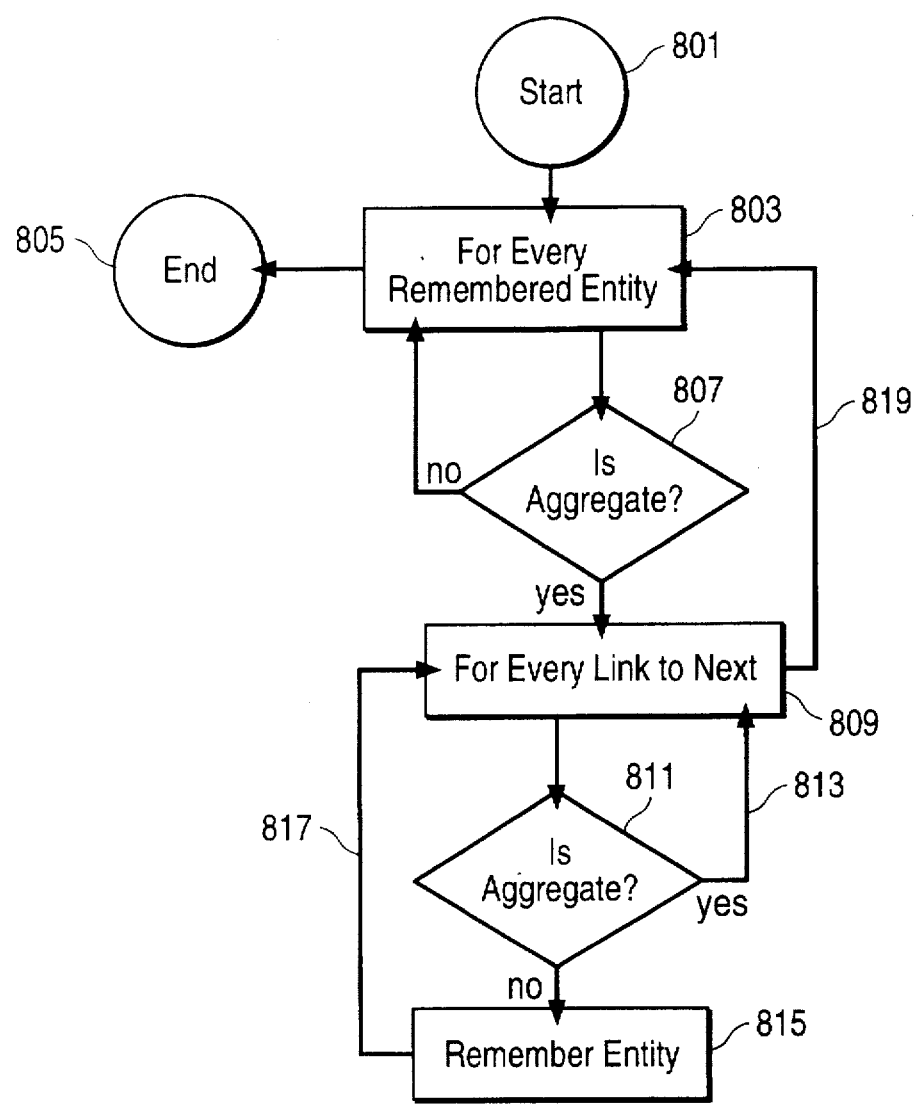
FIG. 8 illustrates the process for disassembling an existing aggregate data structure prior to rebuilding aggregates incorporating new references in accordance with a preferred embodiment.

FIG. 8 illustrates the process used to disassemble aggregates. At this point the remembered entities include both aggregates and aged non-aggregate history data structures. The process starts at a terminal 801. At an iteration step 803 the process examines every remembered entity. When all the entities have been examined, the process completes through a terminal 805. During the iteration step 803, each remembered entity is examined at a decision block step 807 to determine whether the entity is an aggregate. If at the decision block 807 the entity is not an aggregate, the iteration step 803 continues with the next remembered entity. However, if at the decision block 807 the entity is an aggregate, the process continues to an iteration step 809 to detach each history data structure 510 from the aggregate. The iteration step 809 performs this task by following the "Link to Next" field 511 of the aggregate history data structure until the "Link to Next" field 511 contains a NIL. At a decision block step 811, the history data structure is again checked to see whether it is an aggregate record (thus allowing aggregates of aggregates). If so, as indicated by an arrow 813, the process recursively processes the new aggregate. However, if at the decision block 811 the record is not an aggregate, the entity is removed from the linked list and is remembered at a step 815. The process continues to the iteration step 809 as indicated by an arrow 817 and the process continues until all the links of the original aggregate have been removed from the aggregate (with possible recursion). At that point the iteration step 809 completes and the process continues with the next remembered entity at the iteration step 803 as indicated by an arrow 819.

Figure 9:
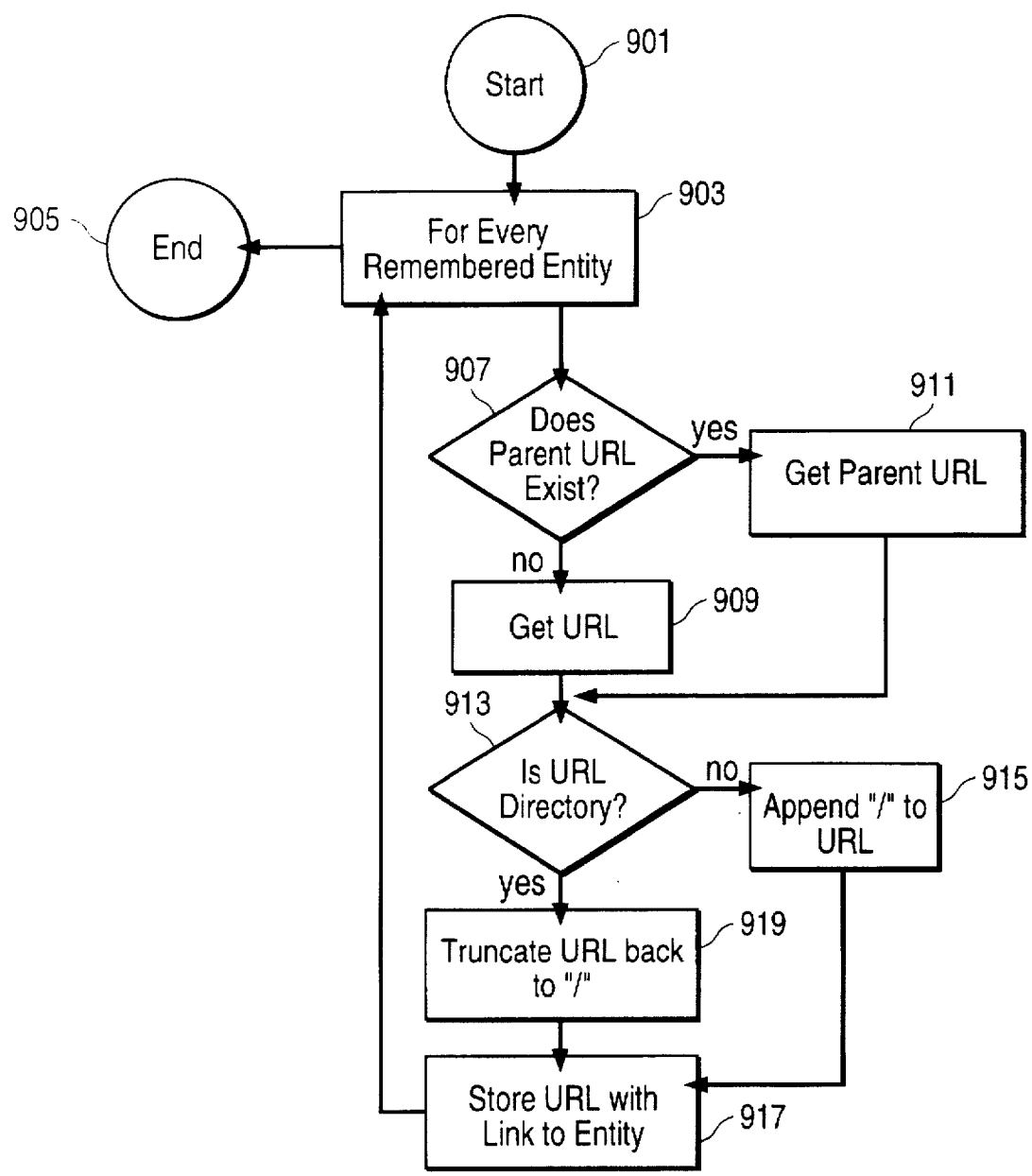
FIG. 9 illustrates the process used to extract truncated hyperlinks from existing data history records in accordance with a preferred embodiment.

FIG. 9 illustrates the process used to extract directories from remembered entities. The following description is targeted to ward URL based hyperlinks. However, as recognized by one skilled in the art, an appropriately modified process can be applied to hyperlinks having a different structure. At this point in the process, each remembered entity is an unconnected history data structure 510. The process starts at a terminal 901 and enters an iteration step 903 that processes each remembered history data structure 510 entity. After the iteration step 903 finishes, the process completes through a terminal 905. The processing within the iteration step 903 first starts with a decision block step 907 that determines whether a parent URL exists. If at the decision block 907 the parent URL does not exist (as determined by a NIL in the "Link to META Parent URL" field 531) the process, at a step 909, extracts a hyperlink from the "URL" field 525. If at the decision block 907, a parent URL does exist, the process, at a step 911, extracts the parent URL from the "META Parent URL" field 537. Regardless of which hyperlink was extracted the process then determines if the hyperlink specified a hypernode at a decision block 913. The decision block 913 determines this by examining the appropriate "Directory Flag" field 529 or 537. If at the decision block 913 the hyperlink does not specify a hypernode, the process at a step 915, appends the character "/" to the extracted string unless the string already ends with the character "/". Then at a step 917, the hyperlink is stored along with a link to its source history data structure entity and the process continues through the iteration step 903. However if at the decision block 913, the hyperlink specifies a hypernode, a truncation step 919 removes characters from the end of the hyperlink sting until it sees the "/" character. Then at the step 917, the hyperlink is stored along with a link to its source history data structure entity and the process continues through the iteration step 903. One skilled in the art will understand that the description above specifying the "/" air character is directed towards URL style hyperlinks and that other operations would be required for non-URL hyperlinks.

Figure 10:
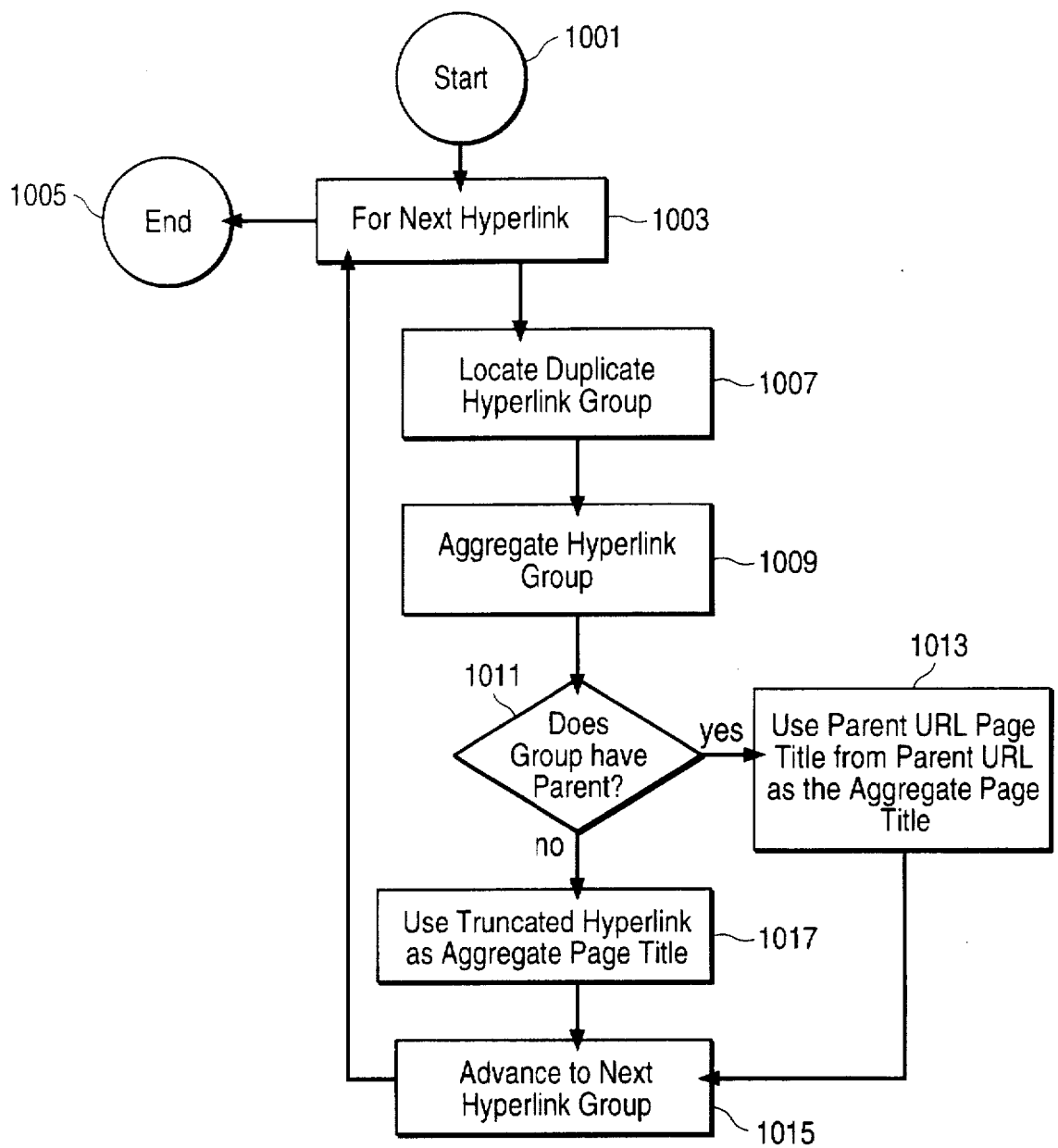
FIG. 10 illustrates the process used to create a new aggregate data history record in accordance with a preferred embodiment.

FIG. 10 illustrates the process used to combine the saved truncated hyperlinks into an aggregate. At this point in the process there are a number of entities conforming to the history data structure 510 along with hyperlinks conforming to the hyperlink sorting data structure 690 that are linked back to their corresponding entities. The aggregation process starts at a terminal 1001. Then at an iteration step 1003 the process examines the directories. When all the directories have been examined by the iteration step 1003, the process completes through the terminal 1005. During the iteration step 1003, at a step 1007, the process determines the number of hyperlink sorting data records containing duplicate truncated hyperlinks. After collecting the duplicate hyperlink records the entities associated with the duplicate hyperlinks are aggregated at a step 1009. The aggregation process of the step 1009 comprises initializing a history data record 510 as an aggregate history data record and linking to it the entities linked to each of hyperlink sorting data records containing the hyperlinks being aggregated. Next at a decision block 1011 the group is checked to determine whether any of the entities comprising the elements of the group have a parent hypernode. If the decision block 1011 is satisfied (by detecting a non-NIL entity in the "Pointer to META Parent URL" field 531), a step 1013 uses the parent's hypernode title for the title of the aggregate. The step 1013 also detects (not shown) if there are multiple non-aggregate history data structures in the aggregate that have different parent hyperlinks and if so, simply saves the first entity with such a parent hyperlink in the new history list and removes the offending entity from the aggregate. Next the process continues to a step 1015 that advances to the next truncated hyperlink group and continues processing at the iteration step 1003. However if at the decision block 1011, the group did not include an entity with a parent URL, the directory URL is placed in the "Page Title" field 517. Next the process continues to a step 1015 that advances to the next truncated hyperlink group and continues processing at the iteration step 1003.

One skilled in the art will understand that the invention as described above teaches an improved method of displaying a history of accessed hypernodes.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for presenting information relating to each of a plurality of hyperlinks; said method comprising:
   (a) creating a plurality of truncated hyperlink references by determining a truncated hyperlink for each of said plurality of hyperlinks;
   (b) matching a first truncated hyperlink reference from said plurality of truncated hyperlink references with a second truncated hyperlink reference from said plurality of truncated hyperlink references; said first and second truncated hyperlink reference referencing to a first information and a second information respectively;
   (c) combining said first and second truncated hyperlink references to form a hyperlink aggregate having an aggregate information; and
   (d) presenting said aggregate information in place of said first and second information.

2. The computer controlled method of claim 1 wherein step (a) further comprises the step of disassembling an existing aggregate to add additional truncated hyperlink references to said plurality of truncated hyperlink references.

3. The computer controlled method of claim 1 wherein step (b) further comprises the step of matching said first truncated hyperlink reference and said second truncated hyperlink reference based on said first and second truncated hyperlink reference having a common meta parent URL.

4. The computer controlled method of claim 1 wherein step (b) further comprises the step of matching said first truncated hyperlink reference and said second truncated hyperlink reference based on said first and second truncated hyperlink reference having a common hyperlink hierarchy.

5. The computer controlled method of claim 1 wherein step (c) further comprises the step of determining said aggregate information from said first and second information.

6. An information presentation apparatus configured to present information relating to each of a plurality of hyperlinks; said apparatus having a central processing unit (CPU), a memory, and a display device; said apparatus comprising
   a creation mechanism configured to create a plurality of truncated hyperlink references by determining a truncated hyperlink for each of said plurality of hyperlinks;
   a first matching mechanism configured to match a first truncated hyperlink reference from said plurality of truncated hyperlink references with a second truncated hyperlink reference from said plurality of truncated hyperlink references; said first and second truncated hyperlink reference referencing to a first information and a second information respectively;
   a combination mechanism configured to combine said first and second truncated hyperlink references to form a hyperlink aggregate having an aggregate information; and
   a presentation mechanism configured to present said aggregate information in place of said first and second information.

7. The information presentation apparatus of claim 6 wherein said creation mechanism further comprises a disassembly mechanism configured to disassemble an existing aggregate to add additional truncated hyperlink references to said plurality of truncated hyperlink references.

8. The information presentation apparatus of claim 6 wherein said first matching mechanism further comprises a second matching mechanism configured to match said first truncated hyperlink reference and said second truncated hyperlink reference based on said first and second truncated hyperlink reference having a common meta parent URL.

9. The information presentation apparatus of claim 6 wherein said first matching mechanism further comprises a second matching mechanism configured to match said first truncated hyperlink reference and said second truncated hyperlink reference based on said first and second truncated hyperlink reference having a common hyperlink hierarchy.

10. The information presentation apparatus of claim 6 wherein said combination mechanism further comprises a determination mechanism configured to determine said aggregate information from said first and second information.

11. An information presentation system configured to present information relating to each of a plurality of hyperlinks; said system comprising
   a creation mechanism configured to create a plurality of truncated hyperlink references by determining a truncated hyperlink for each of said plurality of hyperlinks;
   a matching mechanism configured to match a first truncated hyperlink reference from said plurality of truncated hyperlink references with a second truncated hyperlink reference from said plurality of truncated hyperlink references; said first and second truncated hyperlink reference referencing to a first information and a second information respectively;
   a combination mechanism configured to combine said first and second truncated hyperlink references to form a hyperlink aggregate having an aggregate information; and
   a presentation mechanism configured to present, on a display device, said aggregate information in place of said first and second information. The information presentation apparatus of claim 5 wherein said creation mechanism further comprises a disassembly mechanism configured to disassemble an existing aggregate to add additional truncated hyperlink references to said plurality of truncated hyperlink references.

12. The information presentation system of claim 11 wherein said creation mechanism further comprises a disassembly mechanism configured to disassemble an existing aggregate to add additional truncated hyperlink references to said plurality of truncated hyperlink references.

13. The information presentation system of claim 11 wherein said first matching mechanism further comprises a second matching mechanism configured to match said first truncated hyperlink reference and said second truncated hyperlink reference based on said first and second truncated hyperlink reference having a common meta parent URL.

14. The information presentation system of claim 11 wherein said first matching mechanism further comprises a second matching mechanism configured to match said first truncated hyperlink reference and said second truncated hyperlink reference based on said first and second truncated hyperlink reference having a common hyperlink hierarchy.

15. The information presentation system of claim 11 wherein said combination mechanism further comprises a determination mechanism configured to determine said aggregate information from said first and second information.

16. A computer program product comprising:

(a) a computer usable storage medium having computer readable code embodied therein for causing a computer to present information relating to each of a plurality of hyperlinks on a display device; said computer readable code comprising:

(b) computer readable code devices configured to cause said computer to effect a creation mechanism configured to create a plurality of truncated hyperlink references by determining a truncated hyperlink for each of said plurality of hyperlinks;

computer readable code devices configured to cause said computer to effect a matching mechanism configured to match a first truncated hyperlink reference from said plurality of truncated hyperlink references with a second truncated hyperlink reference from said plurality of truncated hyperlink references; said first and second truncated hyperlink reference referencing to a first information and a second information respectively;

computer readable code devices configured to cause said computer to effect a combination mechanism configured to combine said first and second truncated hyperlink references to form a hyperlink aggregate having an aggregate information; and computer readable code devices configured to cause said computer to effect a presentation mechanism configured to present, on a display device, said aggregate information in place of said first and second information.

17. The computer program product of claim 16 wherein said creation mechanism further comprises computer readable code devices configured to cause said computer to effect a disassembly mechanism configured to disassemble an existing aggregate to add additional truncated hyperlink references to said plurality of truncated hyperlink references.

18. The computer program product of claim 16 wherein said first matching mechanism further comprises computer readable code devices configured to cause said computer to effect a second matching mechanism configured to match said first truncated hyperlink reference and said second truncated hyperlink reference based on said first and second truncated hyperlink reference having a common meta parent URL.

19. The computer program product of claim 16 wherein said first matching mechanism further comprises computer readable code devices configured to cause said computer to effect a second matching mechanism configured to match said first truncated hyperlink reference and said second truncated hyperlink reference based on said first and second truncated hyperlink reference having a common hyperlink hierarchy.

20. The computer program product of claim 16 wherein said combination mechanism further comprises computer readable code devices configured to cause said computer to effect a determination mechanism configured to determine said aggregate information from said first and second information.

\* \* \* \* \*